United States Patent
Gross et al.

(10) Patent No.: US 9,544,129 B2
(45) Date of Patent: Jan. 10, 2017

(54) METHOD FOR SYNCHRONIZING AN ISOCHRONOUS SYSTEM WITH A HIGHER-RANKING CLOCK PULSE SYSTEM

(71) Applicant: Siemens Aktiengesellschaft, München (DE)

(72) Inventors: Markus Gross, Fürth (DE); Oswald Käsdorf, Grossenseebach (DE); Armin Schleussinger, Stegaurach (DE); Michael Von Der Bank, Puschendorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/674,937

(22) Filed: Mar. 31, 2015

(65) Prior Publication Data
US 2015/0280903 A1    Oct. 1, 2015

(30) Foreign Application Priority Data

Apr. 1, 2014    (EP) .................. 14163047.5

(51) Int. Cl.
*H04L 7/00*    (2006.01)
*H04L 7/04*    (2006.01)
*G05B 19/042*    (2006.01)

(52) U.S. Cl.
CPC ............. *H04L 7/04* (2013.01); *G05B 19/0426* (2013.01); *H04L 7/0008* (2013.01); *G05B 2219/34001* (2013.01)

(58) Field of Classification Search
CPC .......... H04L 7/00; H04L 27/2655; H03L 7/00; H04B 1/7073; H04B 1/7156; H04B 1/7183; H04J 3/06; H04J 3/0685; H03J 3/0635
USPC .................................. 375/354, 356; 370/503
See application file for complete search history.

(56) References Cited

U.S. PATENT DOCUMENTS

| | | | |
|---|---|---|---|
| 4,694,472 A | 9/1987 | White | |
| 2002/0018458 A1* | 2/2002 | Aiello | H04W 56/0015 370/348 |
| 2006/0056560 A1* | 3/2006 | Aweya | H04J 3/0664 375/356 |
| 2010/0199006 A1* | 8/2010 | Takeuchi | G06F 13/4291 710/107 |
| 2011/0276820 A1 | 11/2011 | Hanssen | |

(Continued)

FOREIGN PATENT DOCUMENTS

| | | |
|---|---|---|
| DE | 4215380 A1 | 11/1993 |
| EP | 0840471 A2 | 5/1998 |
| WO | WO 9845973 A1 | 10/1998 |

*Primary Examiner* — Khanh C Tran
(74) *Attorney, Agent, or Firm* — Henry M. Feiereisen LLC.

(57) ABSTRACT

A method for synchronizing a basic clock pulse system having a plurality of synchronized components with a higher-ranking clock pulse system includes, in a first step of the synchronization, determining a phase difference between an actual phase of the basic clock pulse system and a nominal phase of the higher-ranking clock pulse system and transmitting the phase difference to the components of the basic clock pulse system and, in a second step of the synchronization, using the determined phase difference as a pilot control for each component, i.e. for the pilot control of a clock pulse generator of each component.

6 Claims, 3 Drawing Sheets

(56) References Cited

U.S. PATENT DOCUMENTS

2013/0003757 A1* 1/2013 Boatright .............. H04J 3/0697
370/474

* cited by examiner

METHOD FOR SYNCHRONIZING AN ISOCHRONOUS SYSTEM WITH A HIGHER-RANKING CLOCK PULSE SYSTEM

CROSS-REFERENCES TO RELATED APPLICATIONS

This application claims the priority of European Patent Application, Serial No. 14163047.5, filed Apr. 1, 2014, pursuant to 35 U.S.C. 119(a)-(d), the content of which is incorporated herein by reference in its entirety as if fully set forth herein.

BACKGROUND OF THE INVENTION

The present invention relates to a method for synchronizing an isochronous system with a previously independent topologically higher-ranking clock pulse system. For differentiation from the higher-ranking clock pulse system, the clock pulse system of the isochronous system, which is to be connected to the higher-ranking clock pulse system, is referred to in the following as an isochronous basic clock pulse system or in short as a basic clock pulse system.

The following discussion of related art is provided to assist the reader in understanding the advantages of the invention, and is not to be construed as an admission that this related art is prior art to this invention.

An example of a basic clock pulse system can include a plurality of fundamentally independent components or devices—in the following referred to collectively as components—is a system in the form of a production machine, a machine tool, a robot or the like. In the following, a system of this kind is referred to collectively, but without sacrificing broader generality, as a production machine.

In a basic clock pulse system of this kind, it is known to use a plurality of clock pulses with different periods, which, on the one hand, all have to be synchronized between the components of the basic clock pulse system and, on the other, must also be in a defined phase relationship to one another.

This requires the following consistency conditions to be fulfilled:
- a component functioning as a master clock issues a clock pulse, which is hereinafter referred to as a communication clock pulse, to the other components of the basic clock pulse system. The period of the communication clock pulse determines the shortest clock pulse that can be used in the basic clock pulse system. All components are synchronized with the communication clock pulse by means of a local clock pulse generator, in particular a local, digital PLL (DPLL), and the start of the clock pulse period of each other clock pulse in the basic clock pulse system always coincides with the start of a period of the communication clock pulse.
- in addition to the communication clock pulse, the master clock generates a special system clock pulse with which the start of each clock pulse period coincides with the start of the clock pulse periods of all the other inter-synchronized clock pulses. The period of a clock pulse of this kind is the lowest common multiple of the periods of all other clock pulses of the basic clock pulse system. Correspondingly, this is referred to as an LCM clock pulse (LCM=lowest common multiple).

On the basis of the communication clock pulse output by the master clock, each component in the basic clock pulse system generates an independent clock pulse system, which, with the aid of a local clock pulse generator (local DPLL) and other suitable measures fulfils the consistency conditions with respect to the clock pulse system of the master clock. In this case, each consistency condition already achieved is maintained for each component in the basic clock pulse system—partially with the aid of a DPLL.

To connect an isochronous basic clock pulse system of this kind to a previously independent topologically higher-ranking clock pulse system, all clock pulses of the basic clock pulse system have to be phase-shifted so that the two systems are combined to form an overall isochronous system. Here, the phase shift has to take place such that, on the one hand, the consistency of the clock pulses in relation to each other and beyond the different components of the basic clock pulse system is at no time inadmissibly disrupted and that, on the other hand, after the phase shift, the clock pulse systems can be combined such that the consistency conditions mentioned also apply to the overall system.

To date, it has been provided with a method for synchronizing an isochronous system with a higher-ranking clock pulse system that the consistency conditions for all local clock pulses within a component are set and checked by means of a software routine. Here, hardware counters are used to check the phase position of the clock pulses and it is possible to program a phase shift which is then executed in hardware. This only succeeds if the hardware counters for the different clock pulses are read out consistently, i.e. if it is ensured that all counters can be read out before a counter content changes. In a real-time system, this means that this software routine has to be assigned to the quickest time slot.

Between different components, the consistency conditions can only be fulfilled by observing the communication taking place at previously defined times with telegrams defined by a respective protocol. For selective synchronization, the instant of time at which the aforementioned software routine runs is aligned not only with the internal counters but also with the communication. In order to avoid this additional restriction, the phases of the clock pulses affected are changed not selectively, but successively until a faultless communication enables it to be identified that the consistency condition has been fulfilled.

In the case of connection to a higher-ranking clock pulse system, the master clock of the basic clock pulse system first informs all components of the basic clock pulse system that a phase shift is taking place. With the previous method, the master clock then shifts its own clock pulse system until it is synchronous with the higher-ranking clock pulse system. During this, the master clock uses a constant step size for each communication clock pulse. Finally, the master clock informs the other components of the basic clock pulse system that the phase shift has been completed.

This achieves synchronicity of the master clock of the basic clock pulse system with the higher-ranking clock pulse system. During this adaptation and following the adaptation, the master clock continuously emits the communication clock pulse that is authoritative for all components of the basic clock pulse system.

However, the DPLL, with which the other components are held in synchronism with the master clock, is generally optimized in order to suppress interference noise (jitter). This means it is not able to follow the step size during the phase shift (see FIG. 5). Therefore, for a temporary period, another synchronization method is used, which, although it can follow the phase shift, is not able to suppress the jitter. With this other synchronization method, there is an abrupt adaptation of the clock pulse period.

The drawback with this known method for synchronizing an isochronous basic clock pulse system with a previously independent topologically higher-ranking clock pulse system is that, due to the abrupt change to the clock pulse period, in addition to the residual jitter, faultless communication with the master clock is no longer guaranteed, for example due to a violation of one of the transmit time slots assigned to the component. One consequence of communication that is no longer faultless is, for example, that the production machine is automatically brought to a stop.

It would therefore be desirable and advantageous to obviate prior art shortcomings and to provide an improved method for synchronizing an isochronous basic clock pulse system with a previously independent topologically higher-ranking clock pulse system with which the above-described drawbacks are avoided or at least the impacts thereof are reduced.

SUMMARY OF THE INVENTION

According to one aspect of the present invention, in a method for synchronizing an isochronous basic clock pulse system with a previously independent topologically higher-ranking clock pulse system, the basic clock pulse system comprises a plurality of synchronous components each having a clock pulse generator for generating local clock pulses. In a first step of the synchronization, a phase difference between an actual phase of the basic clock pulse system and a nominal phase of the higher-ranking clock pulse system is determined and the phase difference at the components of the basic clock pulse system is transmitted and that, in a second step of the synchronization, the phase difference determined is used as a pilot control of the clock pulse generator of each component. Particularly suitable as local clock pulse generators of the components of the basic clock pulse system are DPLLs so that, in the interests of better legibility, but without sacrificing broader generality, the following description will be continued using the example of DPLLs as local clock pulse generators.

The solution suggested here requires the synchronicity of all clock pulses of the components of basic clock pulse system with the communication clock pulse of the master clock of this basic clock pulse system achieved with the aid of the respective local DPLLs. First, in the master clock, suitable means, in particular suitable hardware is used to generate information from the LCM clock pulse, said information being suitable for transmission to the individual components by usual communication means. For this, the accuracy of this information is reduced to a resolution of one communication clock pulse. All other components of the basic clock pulse system can reconstruct the LCM clock pulse of the master clock from this information and the communication clock pulse. The consistency condition for the master clock is fulfilled when all clock pulses of the actual clock pulse system fulfill the consistency condition with respect to the communication clock pulse and the reconstructed LCM clock pulses. This consistency condition is created by means of hardware, but controlled by corresponding software.

Contrary to the previous procedure, the adaptation of the basic clock pulse system following connection to a higher-ranking clock pulse system is performed in two steps that are independent of each other:

In a first step, first, all periods of the basic clock pulse system are adapted, i.e. a respective phase difference between the basic clock pulse system and the higher-ranking clock pulse system at the time of the connection is adopted as a setpoint value and immediately kept constant. This step is referred to the following as "latching".

Figure 3:
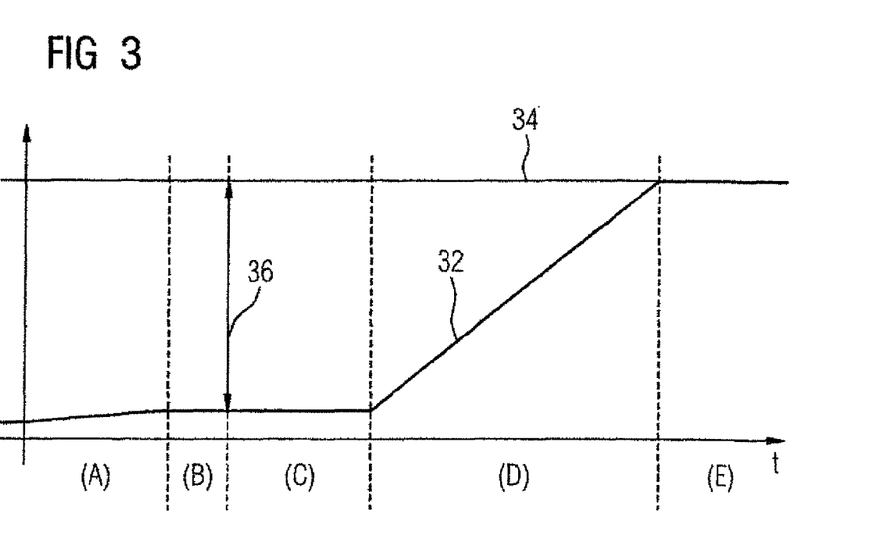
FIG. 3 is a schematically simplified diagram of a course of a synchronization of the basic clock pulse system with a higher-ranking clock pulse system according to the method suggested here.

In a second step, a pre-calculated, planned and deterministic phase shift (see FIG. 3; Section B), i.e. a time-limited pilot control which is performed simultaneously in all components by means of setpoint feedforward, is used to eliminate the initial phase difference to the higher-ranking clock pulse system within the entire basic clock pulse system. This step is referred to in the following as "protraction".

The phase difference determined in the first step and held constant during the course of the first step constant enables the exact course of the second step to be calculated in advance and optionally taking into account additional restrictions, for example a maximum permissible deceleration rate, specifications for observing the transmit time slot, limitations in the hardware, etc., and the result of this calculation to be notified to all components of the basic clock pulse system by means of usual communication means (see FIG. 3; Section C). The calculation is performed by means of software. The period for the calculation and the distribution to all components of the basic clock pulse system is referred in the following as "preparation". The "protraction" (second step; see above) is only successful if this is executed simultaneously for all clock pulses in all components of the basic clock pulse system. This is ensured by means of synchronous pilot control of the clock pulse systems of the components of the basic clock pulse system as described below (see FIG. 3; Section D):

1. The pilot control only begins at the start of an LCM clock pulse. Communication to the components is expanded by a communication means, for example by introducing or expanding a process date, by expanding the telegram header, etc., which enables the starting time of the LCM clock pulse to be transmitted redundantly.
2. The phase shift is taken into account by each DPLL as a time-limited pilot control. Consequently, the DPLL regulator interprets the phase shift not as a fault to be corrected but as a planned setpoint feedforward.

The approach suggested here assumed that two clock pulses are selected for the basic clock pulse system to be adapted to the higher-ranking clock pulse system, said clock pulses representing the entire basic clock pulse system, namely the communication clock pulse and the LCM clock pulse. This results in a minimization of the information required for the synchronization.

The software routine mentioned in the introduction, by means of which the synchronicity of the or each (local) clock pulse of each component of the basic clock pulse system with the communication clock pulse of the master clock is monitored, is relieved of the actual performance of the synchronization with the higher-ranking clock pulse system without losing control over the synchronicity with respect to the communication clock pulse of the master clock. The software routine is always able to influence which clock pulses are synchronized when with the communication clock pulse of the master clock. However, the time of the execution of the software routine no longer has to satisfy a time restriction.

The necessary communication between the components of the basic clock pulse system is reduced to a minimum: the reconstruction of the LCM clock pulse of the master clock only requires the transmission of 1 bit, which can be transported in the context of the communication that would take place anyway, for example in the telegram header or a process date.

Hence, the adaptation to the higher-ranking clock pulse system takes place overall as a fully planned, deterministic process. The application software running on the individual components of the basic clock pulse system is also informed of the start and end of setpoint feedforward and is able to compensate their effects within the application if necessary. This enables and, if necessary, facilitates the further operation of critical systems during the entire synchronization process.

The advantage of the invention consists in the continuous regulation in the individual components of the basic clock pulse system due to the respective local clock pulse and its continuous synchronicity with the communication clock pulse of the master clock and in the fact that it is no longer necessary to change the synchronization process in the components of the basic clock pulse system. There is no longer any need for the previous error-prone switching between PLL synchronization and direct synchronization. The DPLL remains engaged and does not change the operating mode. Similarly, suppression of the transmission jitter by the DPLL during the entire process is ensured.

The entire method is based on protected and redundantly performed transmissions. Unlike the case with the previous method, the failure of individual transmissions cannot result in a loss of synchronicity of a component at any time.

The invention is advantageously implemented in software. Insofar, the invention also includes a computer program with programming code instructions which, in the case of execution by means of a processing unit in the form of or in the style of microprocessor, effects the execution of the method described here and in the following. The execution of the computer program takes place on the component of the basic clock pulse system that functions as a master clock in the basic clock pulse system. Where the explanation of the objective method and special embodiments describes the execution of individual actions (determination, transmission, usage, etc.), such actions are always performed automatically, for example under the control of the computer program or a corresponding processing function of the further components of the basic clock pulse system.

Finally, the invention is also a computer program product, for example in the form of a digital storage medium, with a computer program with programming code means or electronically readable control signals, which is able to interact with a processing unit in the form of or in the style of a microprocessor such that a method such as that described here and below is executed and a production machine of the type mentioned in the introduction, wherein a computer program of this kind is or can be loaded into a memory of at least one component of the production machine.

Advantageous embodiments of the invention are the subject matter of the dependent claims. Any back-references used therein relate to the further development of the subject matter of the main claim on the basis of the features of the respective dependent claim. They should not be understood to be a renunciation of the achievement of an independent, objective protection for the feature combinations of the related dependent claims. With regard to an interpretation of the claims in a more detailed concrete formulation of a feature in subordinate claim, it is furthermore to be assumed that such a restriction is not present in the respective preceding claims. Finally, reference is made to the fact that the method disclosed can also be developed in accordance with the dependent apparatus claims and vice versa.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic diagrams and fragmentary views. In certain instances, details which are not necessary for an understanding of the present invention or which render other details difficult to perceive may have been omitted.

Figure 1:
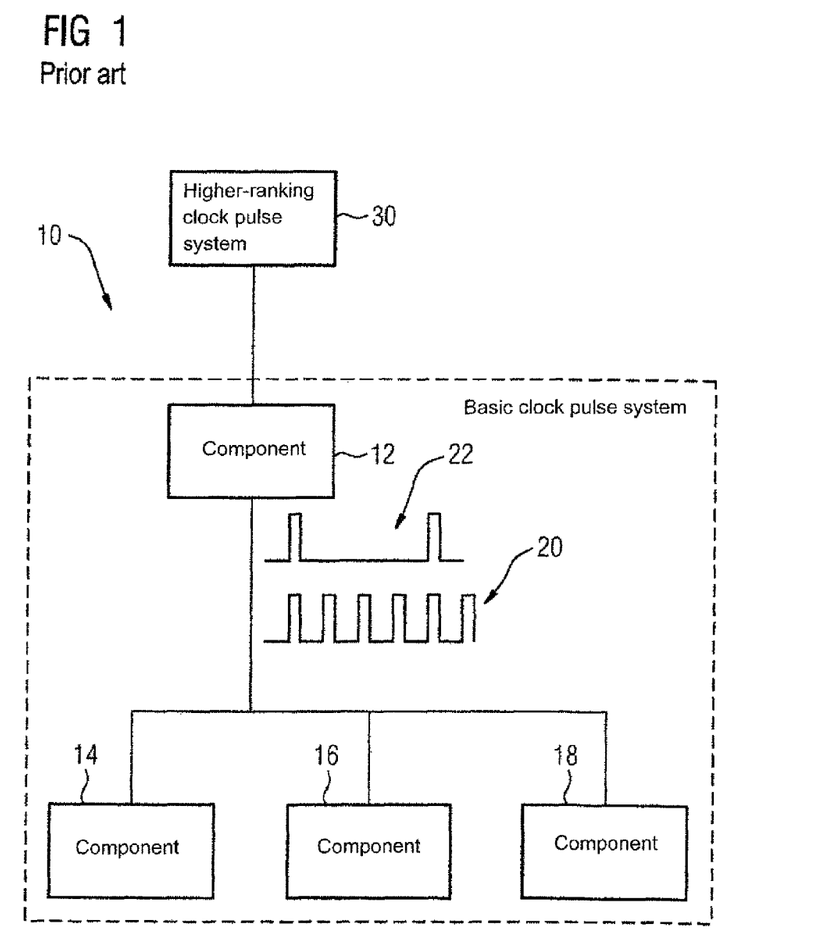
FIG. 1 is a schematically simplified diagram of a production machine understood in the following as a basic clock pulse system.

Turning now to the drawing, and in particular to FIG. 1, there is shown in a schematically greatly simplified illustration a device described in the following as a basic clock pulse system 10 with individual components 12, 14, 16, 18 thereof, wherein one of the components 12-18 functions as a master clock 12 in the basic clock pulse system 10 and wherein all components 12 are communicatively connected to one another in a way that is known per se. The device described here as a basic clock pulse system 10 is, for example, a production machine according to the definition given in the introduction.

For the synchronization of all components 12-18 of the basic clock pulse system 10, the master clock 12 emits a communication clock pulse 20 and an LCM clock pulse 22. The period of the communication clock pulse 20 specifies the period of the shortest local clock pulse that can be used within the basic clock pulse system 10 by the components 12-18. The components 14-18, which receive the communication clock pulse 20 from the master clock 12, synchronize all local clock pulses with the communication clock pulse 20 by means of a local DPLL. The LCM clock pulse 22 is a system clock pulse of the basic clock pulse system 10, with which the start of each clock pulse period coincides with the start of the clock pulse periods of all, inter-synchronized clock pulses.

Figure 2:
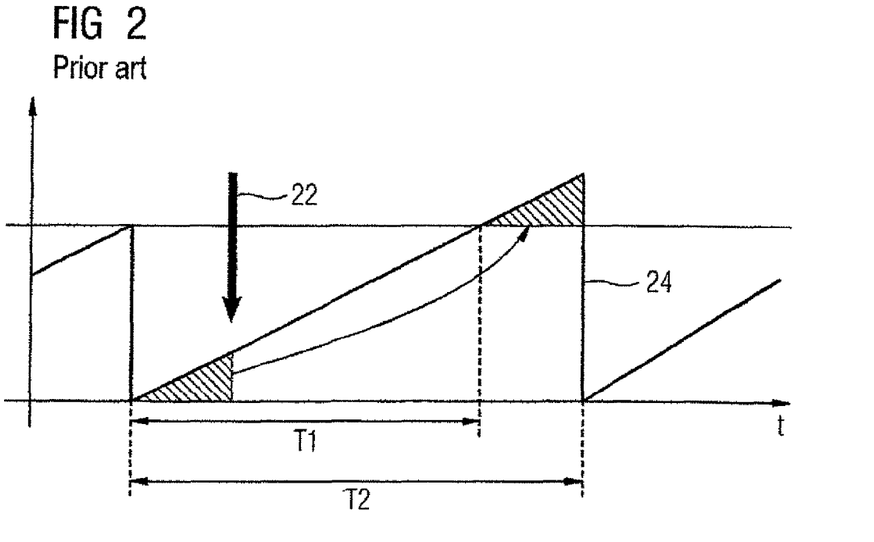
FIG. 2 is a diagram to explain a synchronization of local clock pulses with a system clock pulse (LCM clock pulse)

The diagram in FIG. 2 shows over the time axis t the course of the period of a local clock pulse 24 of one of the components 12-18 of the basic clock pulse system 10 and the synchronization of this local clock pulse 24 with the LCM clock pulse 22 output by the master clock 12. The start of the period of the LCM clock pulse 22 is indicated in the diagram in FIG. 2 with the vertical, downward-pointing arrow. The start of the period of the LCM clock pulse 22 does not coincide with the start of the period of the local clock pulse 24. Hence, the local clock pulse 24 is not synchronous with the LCM clock pulse 22.

To establish synchronicity, the period of the local clock pulse 24 is prolonged. For this, a counter, in particular a hardware counter (not shown) checks in each component 12-18 for each local clock pulse 24 the phase position of the local clock pulse 24 and, if applicable, a phase shift is performed. A counter of this kind is started on the start of the period of the respective local clock pulse 24 and stopped on the arrival of the LCM clock pulse 22. The counter content is then a measure for the phase position of the local clock pulse 24 relative to the LCM clock pulse 22. To achieve synchronicity of the local clock pulse 24 with the LCM clock pulse 22, the period of the local clock pulse 24 is prolonged in accordance with the previously determined counter content.

This is illustrated in the diagram in FIG. 2 by means of the triangle resulting from the start of the period of the local clock pulse 24 until the arrival of the LCM clock pulse 22. To obtain synchronicity of the local clock pulse 24 with the LCM clock pulse 22, the local clock pulse 24 is prolonged at the end of the normal period designated T1 by precisely the duration of this triangle so that the prolonged period designated T2 results. Following the activation of a period with a prolonged period T2 of this kind, the local clock pulse 24 is synchronous with the LCM clock pulse 22.

The diagram in FIG. 3 shows in a schematically simplified form the course of the method suggested here. In this case, it is assumed that an isochronous basic clock pulse system 10 (FIG. 1) is to be synchronized with a previously independent topologically higher-ranking clock pulse system 30 (FIG. 1), which can be a further production machine or a higher-ranking device.

In this case, FIG. 3 shows the phase difference between an actual phase 32 of the basic clock pulse system 10 and a nominal phase 34 of the higher-ranking clock pulse system 30 over the time axis t. At first (Section A), the two systems 10, 30 are not synchronous. The synchronization includes a first and a second step and begins in the context of the first step with a phase designated as "latching" (Section B). At the end of this phase, an instantaneous value of the phase difference 36 between the actual phase 32 of the basic clock pulse system 10 and the nominal phase 34 of the higher-ranking clock pulse system 30 is acquired and adopted as a setpoint value for a synchronous pilot control of the clock pulse systems of the components 12-18 of the basic clock pulse system 10. The period for the determination of the setpoint value for the pilot control and for the distribution of the setpoint value at the components 12-18 of the basic clock pulse system 10 is shown in the diagram in FIG. 3 as a phase directly following the "latching" (Section C).

The pilot control of the components 12-18 of the basic clock pulse system 10 begins at the start of an LCM clock pulse 22, so that the duration of Section C and the start of the subsequent second step of the synchronization of the basic clock pulse system 10 with the higher-ranking clock pulse system 30 depends upon the next start of the period of the LCM clock pulse 22 following the determination of the setpoint value for the pilot control. The second step of the synchronization consists in a phase (Section D) designated a "protraction". During this phase, the pilot control causes— in a manner known per se—the previously determined phase difference 36 to be supplied to the control loop of the local DPLLs of the individual components 12-18 of the basic clock pulse system 10. To this end, the diagram in FIG. 4 shows the components 12-18 of the basic clock pulse system 10 to which the master clock 12 supplies the phase difference determined 36 for the synchronous pilot control.

Figure 4:
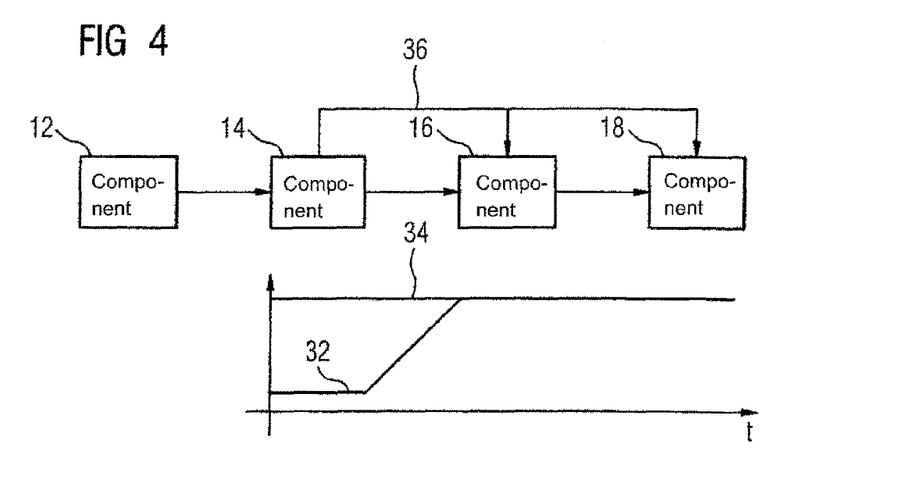
FIG. 4 is a diagram of the basic clock pulse system together with the course according to the present invention, and FIG. 5 for comparison with the diagram in FIG. 4, a previous course of a synchronization of a basic clock pulse system with a higher-ranking clock pulse system.

In the lower portion of the diagram in FIG. 4, to this end, a segment of the temporal course of the synchronization according to the diagram in FIG. 3 is repeated. The actual phases 32 of the components 14-18 and the nominal phase 34 are shown. During the "protraction", the actual phases 32 are adapted synchronously to the nominal phase 34. Hence, the synchronicity of the components 12-18 of the basic clock pulse system 10 is retained during the synchronization of the basic clock pulse system with the higher-ranking clock pulse system 30. The individual components 12-18 continue to be regulated and, for example, no so-called 'following error' ensues.

Figure 5:
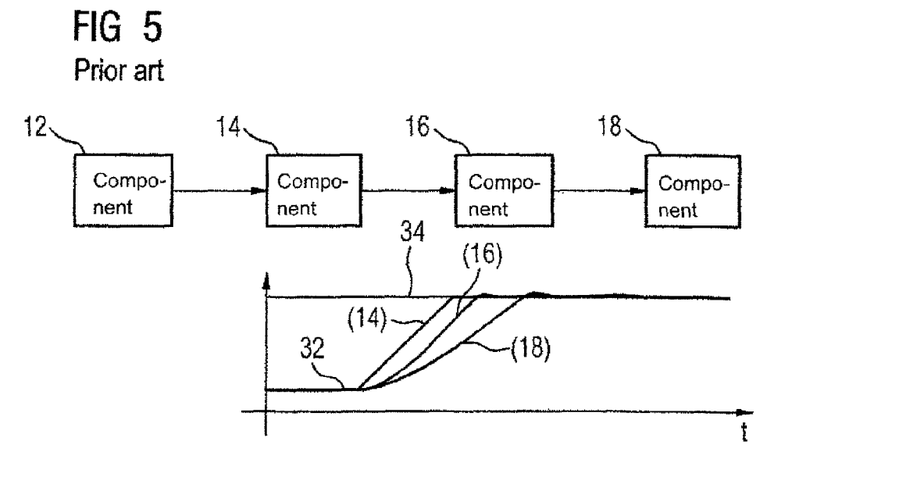

By way of comparison, the diagram in FIG. 5 shows a situation that arises in the case of the previous synchronization of a basic clock pulse system 10 with a higher-ranking clock pulse system 30. It is identifiable that the adaptation of the actual phases 32 of the components 14-18 does not take place synchronously. For this, the individual actual phases 32 of the components 14-18 resulting during the synchronization with the higher-ranking clock pulse system 30 are designated with the reference numbers shown in parentheses in the diagram. The components 14-18 cease to be regulated and disadvantageously a following error occurs.

As soon as synchronicity with the higher-ranking clock pulse system 30 exists, the phase of "protraction" ends and the pilot control is deactivated. The two systems 10, 30 are synchronous (FIG. 3: Section E).

Although the invention was illustrated and described in greater detail by the exemplary embodiment, the invention is not restricted by the disclosed example or examples and the person skilled in the art can derive other variations therefrom without departing from the scope of protection of the invention.

The main individual aspects of the description submitted here can be summarized in brief as follows: a method is disclosed for synchronizing a basic clock pulse system 10 comprising a plurality of synchronized components 12-18 with a higher-ranking clock pulse system 30, wherein, in a first step of the synchronization, a phase difference 36 between an actual phase 32 of the basic clock pulse system 10 and a nominal phase 34 of the higher-ranking clock pulse system 30 is determined and the phase difference 36 at the components 12-18 of the basic clock pulse system 10 is transmitted and wherein in a second step of the synchronization, the phase difference determined 36 is used as a pilot control for each component 12-18, namely for the pilot control of a clock pulse generator of each component 12-18.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for synchronizing with a higher-ranking clock pulse system an isochronous basic clock pulse system having a plurality of synchronous components, each synchronous component having a clock pulse generator for generating local clock pulses, the method comprising:

in a first step of the synchronization, determining a phase difference between an actual phase of the basic clock pulse system and a nominal phase of the higher-ranking clock pulse system and transmitting the phase difference to the components of the basic clock pulse system, in a second step of the synchronization, using the determined phase difference as a pilot control of the clock pulse generator of each synchronous component, and deactivating the pilot control is as soon as the basic clock pulse system has been synchronized with the higher-ranking clock pulse system.

2. A method for synchronizing with a higher-ranking clock pulse system an isochronous basic clock pulse system having a plurality of synchronous components, each synchronous component having a clock pulse generator for generating local clock pulses, the method comprising:

in a first step of the synchronization, determining a phase difference between an actual phase of the basic clock pulse system and a nominal phase of the higher-ranking clock pulse system and transmitting the phase difference to the components of the basic clock pulse system, in a second step of the synchronization, using the determined phase difference as a pilot control of the clock pulse generator of each synchronous component, and operating one of the synchronous components in the basic clock pulse system as a master clock and generating with the master clock a communication clock pulse and an LCM (lowest common multiple) clock pulse for the synchronous components in the basic clock pulse system excluding the master clock, wherein all local clock pulses used by the components are synchronized with the communication clock pulse and wherein a period of the LCM clock pulse is the lowest common multiple of the periods of all local clock pulses of the basic clock pulse system, and wherein the second step of the synchronization and the pilot control of the clock pulse generator of the synchronous components of the basic clock pulse system begins with the start of a period of the LCM clock pulse.

3. The method of claim 2, further deactivating the pilot control is as soon as the basic clock pulse system has been synchronized with the higher-ranking clock pulse system.

4. A production machine comprising a first component operating as a master clock and comprising a processing unit and a memory, wherein the processing unit of the production machine is configured to execute a computer program comprising programming code stored on a non-transitory computer-readable medium, when the computer program is loaded into the memory to synchronize with a higher-ranking clock pulse system having a first synchronous component operating as a master clock an isochronous basic clock pulse system having a plurality of second synchronous components, each second synchronous component having a clock pulse generator for generating local clock pulses, by in a first step of the synchronization, determining a phase difference between an actual phase of the basic clock pulse system and a nominal phase of the higher-ranking clock pulse system and transmitting the phase difference to the second synchronous components of the basic clock pulse system, in a second step of the synchronization, using the determined phase difference as a pilot control of the clock pulse generator of each second synchronous component, and operating one of the synchronous components in the basic clock pulse system as a master clock and generating with the master clock a communication clock pulse and an LCM (lowest common multiple) clock pulse for the synchronous components in the basic clock pulse system excluding the master clock, wherein all local clock pulses used by the components are synchronized with the communication clock pulse and wherein a period of the LCM clock pulse is the lowest common multiple of the periods of all local clock pulses of the basic clock pulse system, and wherein the second step of the synchronization and the pilot control of the clock pulse generator of the synchronous components of the basic clock pulse system begins with the start of a period of the LCM clock pulse.

5. A computer program product comprising programming code stored on a non-transitory computer-readable medium, wherein when the computer program product is executed on a processing unit of a production machine, after being loaded into a memory of the processing unit, causes the processing unit to synchronize with a higher-ranking clock pulse system having a first synchronous component operating as a master clock an isochronous basic clock pulse system having a plurality of second synchronous components, each second synchronous component having a clock pulse generator for generating local clock pulses, by in a first step of the synchronization, determining a phase difference between an actual phase of the basic clock pulse system and a nominal phase of the higher-ranking clock pulse system and transmitting the phase difference to the second synchronous components of the basic clock pulse system, in a second step of the synchronization, using the determined phase difference as a pilot control of the clock pulse generator of each second synchronous component, and operating one of the synchronous components in the basic clock pulse system as a master clock and generating with the master clock a communication clock pulse and an LCM (lowest common multiple) clock pulse for the synchronous components in the basic clock pulse system excluding the master clock, wherein all local clock pulses used by the components are synchronized with the communication clock pulse and wherein a period of the LCM clock pulse is the lowest common multiple of the periods of all local clock pulses of the basic clock pulse system, and wherein the second step of the synchronization and the pilot control of the clock pulse generator of the synchronous components of the basic clock pulse system begins with the start of a period of the LCM clock pulse.

6. A non-transitory computer-readable digital storage medium with electronically readable control signals, storing a computer program wherein the computer program executed on a processing unit of a processing machine, after being loaded into a memory of the processing unit, causes the processing unit to synchronize with a higher-ranking clock pulse system having a first synchronous component operating as a master clock an isochronous basic clock pulse system having a plurality of second synchronous components, each second synchronous component having a clock pulse generator for generating local clock pulses, by in a first step of the synchronization, determining a phase difference between an actual phase of the basic clock pulse system and a nominal phase of the higher-ranking clock pulse system and transmitting the phase difference to the second synchronous components of the basic clock pulse system, and in a second step of the synchronization, using the determined phase difference as a pilot control of the clock pulse generator of each second synchronous component and operating one of the synchronous components in the basic clock pulse system as a master clock and generating with the master clock a communication clock pulse and an LCM (lowest common multiple) clock pulse for the synchronous components in the basic clock pulse system excluding the master clock, wherein all local clock pulses used by the components are synchronized with the communication clock pulse and wherein a period of the LCM clock pulse is the lowest common multiple of the periods of all local clock pulses of the basic clock pulse system, and wherein the second step of the synchronization and the pilot control of the clock pulse generator of the synchronous components of the basic clock pulse system begins with the start of a period of the LCM clock pulse.

\* \* \* \* \*